United States Patent [19]
Withrow

[11] 3,742,476
[45] June 26, 1973

[54] FLUID FLOW INDICATING SYSTEM

[75] Inventor: Robert B. Withrow, San Diego, Calif.

[73] Assignee: Apex Supply Co. of San Diego, San Diego, Calif.

[22] Filed: Nov. 5, 1971

[21] Appl. No.: 196,237

Related U.S. Application Data

[63] Continuation of Ser. No. 48,859, June 12, 1970, abandoned, which is a continuation of Ser. No. 797,373, Feb. 3, 1969, abandoned, which is a continuation of Ser. No. 485,155, Sept. 7, 1965, abandoned.

[52] U.S. Cl. .................. 340/239 R, 73/204
[51] Int. Cl. ........................... G08b 21/00
[58] Field of Search ............. 340/244, 239; 73/204, 295, 304

[56] References Cited
UNITED STATES PATENTS

| | | | |
|---|---|---|---|
| 2,375,497 | 5/1945 | Scully | 323/68 |
| 2,509,889 | 5/1950 | Shockley | 73/204 X |
| 2,756,410 | 7/1956 | Tobias | 340/244 B X |
| 2,861,159 | 11/1958 | Seney | 137/392 X |
| 2,926,299 | 2/1960 | Rogoff | 73/295 UX |
| 3,015,232 | 1/1962 | Schnoll | 73/204 |
| 3,049,887 | 8/1962 | Sharp et al. | 137/392 X |
| 3,142,170 | 7/1964 | Calhoun | 73/204 X |
| 3,196,679 | 7/1965 | Howland | 73/295 X |
| 3,201,776 | 8/1965 | Morrow et al. | 340/261 |
| 3,304,766 | 2/1967 | Hubby | 73/204 X |
| 3,335,606 | 8/1967 | Scarpa | 73/204 |
| 3,363,466 | 1/1968 | Guidi | 73/295 |

FOREIGN PATENTS OR APPLICATIONS

| | | | |
|---|---|---|---|
| 545,384 | 8/1956 | Belgium | 73/295 |
| 594,721 | 3/1960 | Canada | 340/239 S |
| 1,410,911 | 8/1965 | France | 73/204 |

Primary Examiner—Donald J. Yusko
Assistant Examiner—Daniel Myer
Attorney—Warren H. F. Schmieding

[57] ABSTRACT

A system utilizing a probe for ascertaining the rate of flow of a stably maintained fluid, i.e., a fluid which is not being subjected to a change from a liquid to a gas or vapor, or vice versa, the probe being of the type in which the temperature responsive sensor thereof is heated, tending to maintain the sensor at a substantially constant temperature.

3 Claims, 3 Drawing Figures

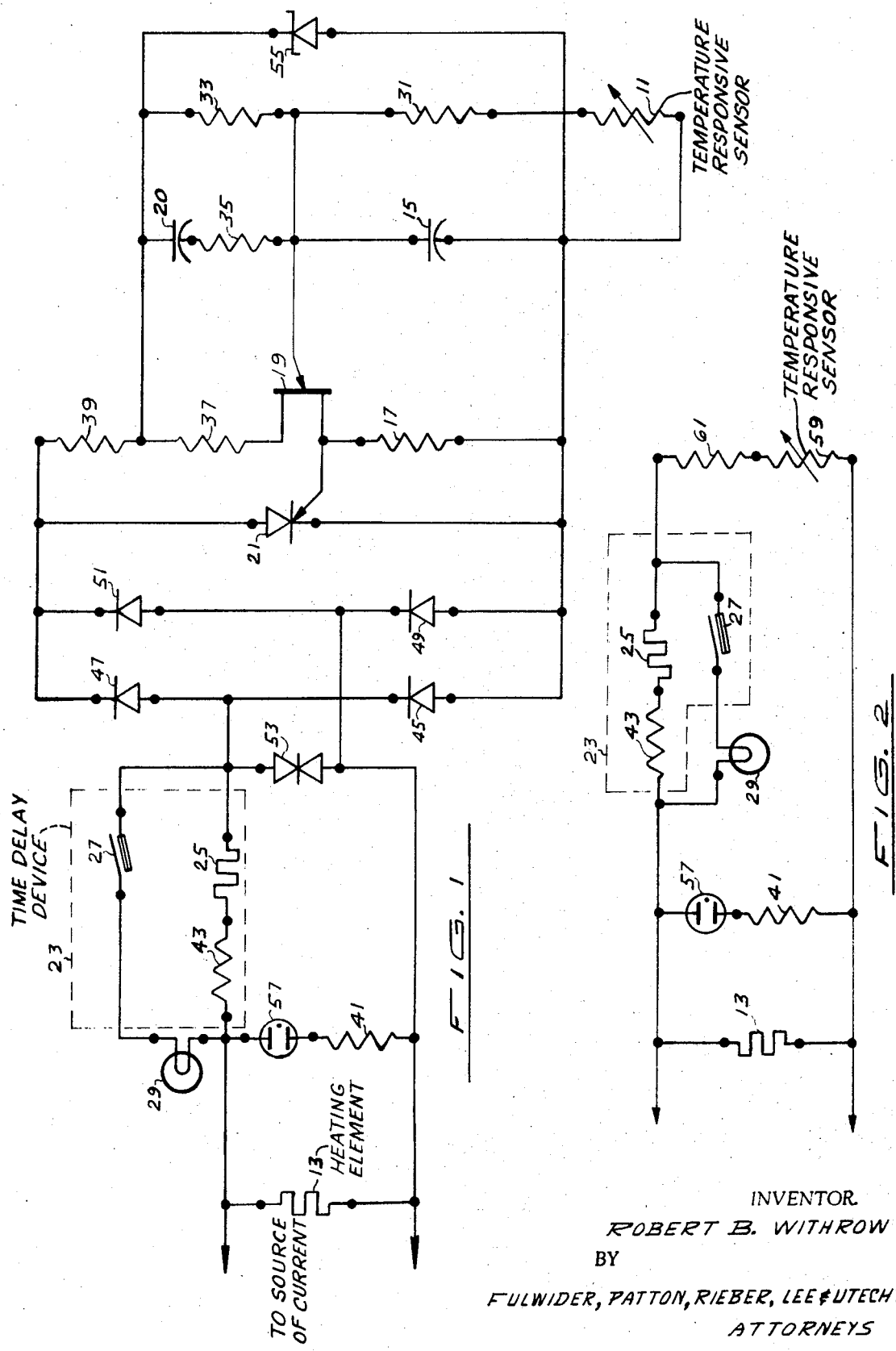

INVENTOR.
ROBERT B. WITHROW
BY
FULWIDER, PATTON, RIEBER, LEE & UTECHT
ATTORNEYS 3,742,476

FLUID FLOW INDICATING SYSTEM

CROSS-REFERENCE TO RELATED APPLICATIONS

The present application is a continuation of applicant's prior application Ser. No. 48,859 filed June 12, 1970, which was a continuation of Ser. No. 797,373 filed Feb. 3, 1969, which was a continuation of Ser. No. 485,155 filed Sept. 7, 1965, the latter three applications now being abandoned.

SUMMARY OF THE INVENTION

The system essentially comprises means for sensing the heat dissipation and generating a signal means tending to maintain the sensing means at a substantially constant temperature, and an indicator responsive to the flow signal.

Further objects and the advantages will be apparent from the following description, reference being had to the accompanying drawings wherein preferred embodiments of the invention are illustrated.

IN THE DRAWINGS:

FIG. 1 is an electrical circuit diagram of a system embodying a form of this invention;

FIG. 2 is an electrical circuit diagram of a system embodying another form of this invention.

Figure 3:
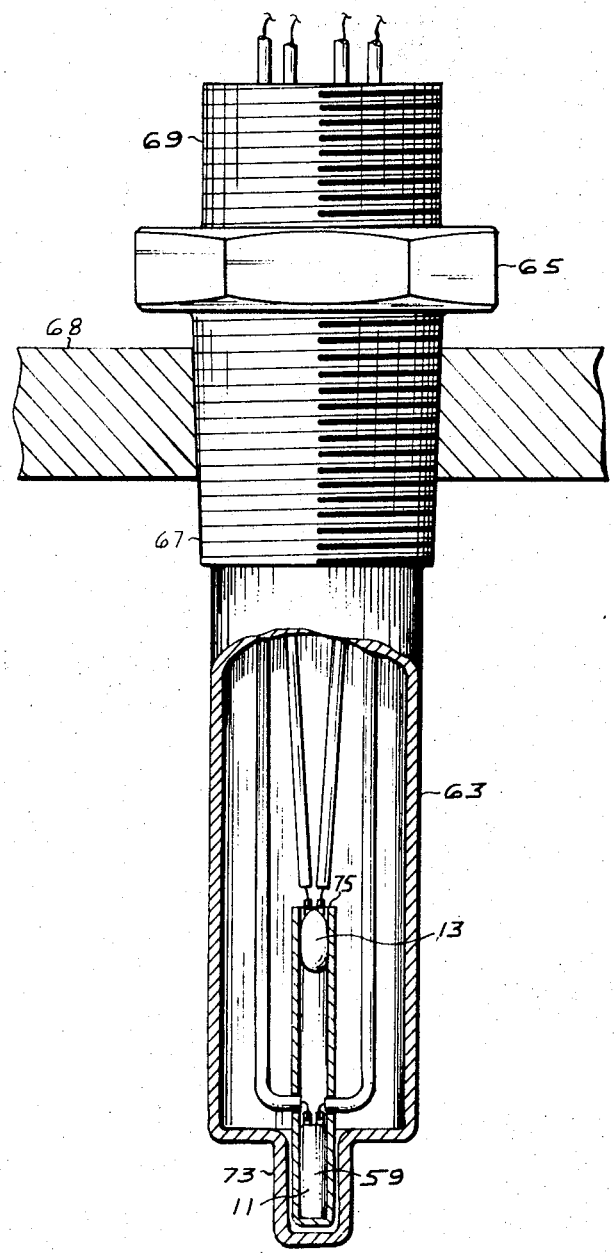
FIG. 3 is a sectional view through a probe used with the circuits shown in FIGS. 1 and 2.

Referring to the drawings in detail, FIG. 1 illustrates a fluid flow indicator system, employing a temperature responsive sensing element 11 with a negative coefficient of resistance. Said sensing element is maintained at a substantially constant, elevated temperature, relative to the fluid, by the heating element 13 when fluid is not flowing.

When the sensor 11 is cooled by the flow of fluid, causing an increased rate of head exchange between it and the flowing fluid, its resistance increases effecting an increase in voltage across the capacitor 15 and the biasing resistor 17. When the peak voltage of the unijunction transistor 19 is reached, the transistor actuates, triggering the silicon controlled rectifier 21. This closes the circuit, increasing current flow through the time delay device 23. Substantially instantaneous full current flow through the time delay device is assured by the resultant reduction of the voltage across the unijunction transistor 19 causing an increase in voltage across capacitor 20 resulting in its discharge. The discharged condition of the capacitor 20 permits a greater charging current to be introduced to the biasing capacitor 15, thus increasing the actuating voltage impressed on the unijunction transistor 19 and the assuring of full current flow through the time delay device 23 by turning on silicon controlled rectifier 21.

In the preferred embodiment the time delay device comprises a heating member 25 which acts to heat a bimetallic switch 27. Said bimetallic switch is so designed that it will be heated sufficiently to make electrical contact a predetermined period of time after the heating element 25 is energized. Such contact energizes an alarm such as the alarm light 29.

From the foregoing it can be seen that the alarm 29 will not be actuated by momentary cooling of the sensing element 11, but will be actuated only when the sensor has remained cooled for the period of time predetermined by the characteristics of the heating element 25 and the bimetallic switch 27. Such features provide against false alarms resulting from minor fluid disturbances in the area of the sensing element 11.

Resistors 17, 31, 33, 37 and 39 serve as voltage dividers and will not be discussed further. As shown, elements 35, 41 and 43 are current limiters.

Diodes 45, 47, 49 and 51 are employed to rectify alternating current thus permitting the system to be operated from a standard power source.

Diodes 53 and 55 are utilized to protect against power surges which may tend to damage other components in the system. The neon light 57 serves as an indicator to indicate when the system is energized.

FIG. 2 shows an embodiment of this invention similar to that shown in FIG. 1 except that the system therein shown utilizes a positive coefficient of resistance sensing element 59. The system is substantially the same as that described above in connection with FIG. 1, except that there is no need for the amplifiers, accompanying capacitors, nor the rectifying diodes. The resistor 61 has been added to serve as a voltage divider.

Cooling of the positive coefficient of resistance sensing element 59 effects a decrease in its resistance, thus increasing the rate of the current flow through the circuit. This increase in current acts to increase the heat exchange rate between the heater element 25 and the bimetallic switch 27. Such heating of the said switch causes it to expand and make contact, thus actuating the alarm light 29.

A preferred embodiment of the sensing probe is shown in FIG. 3. This probe comprises a metallic casing 63, sensing element 11 or 59, heating element 13, wrench engaging means 65, threads 67 adapted to engage similar threads in the fluid containing chamber 68, and threads 69 adapted to facilitate connecting the probe to an electrical conduit or portable case. The casing 63 includes a hollow tip 73 of substantially the same size as the sensing element 11 or 59 and into which the sensing element is disposed. The relatively small mass of the sensing element and the tip renders said element extremely sensitive to small temperature changes in the surrounding fluid. The heating element 13 is disposed in the larger portion of the probe and is significantly larger than the sensing element 11 or 59, thus permitting more power to be introduced to the heater, without danger of burning up the element.

The preferred embodiment also includes a heat exchange inducing member 75, of highly thermal conductive material, to facilitate heating of the sensing element 11 or 59. This member encompasses the sensing element 11 or 59 and the heating element 13, maintaining them disposed from each other by such a distance that said distance to cross section ratio of said member establishes the proper heat exchange relationship to assure the desired sensor response to fluid flow.

As is apparent from the drawing, FIG. 3, the sensing element and the heating element, being encased by the metallic casing 65, are not disposed in the fluid whose flow is being measured and, therefore, short circuiting through conductive fluid cannot occur.

From the above it will be apparent that this invention provides a simple and highly reliable means for detecting fluid flow and for detecting fluid temperature change.

I claim:

1. A system for sensing a change of temperature of a liquid, said system comprising:

A. a source of current;
B. a temperature responsive sensing element (11 or 59);
C. an electric heating member (25);
D. a circuit connected across the source of current including in series said temperature responsive sensing element and said electric heating member;
E. a biasing resistor (17);
F. a unijunction transistor (19);
G. a circuit connected across the source of current including in series said biasing resistor (17), said unijunction transistor (19) and said electric heating member (25);
H. a capacitor (15);
I. a conductor connected with one side of the source of current and with said unijunction transistor, said capacitor being connected in parallel with the temperature responsive sensing element;
J. a silicon-controlled rectifier (21);
K. a circuit connected across the source of current including in series said rectifier and said electric heating member;
L. a conductor connecting the unijunction transistor with the rectifier causing increase of current flow through the electric heating member;
M. a second capacitor (20) connected across the source of current in parallel with said temperature responsive sensing element;
N. an alarm (29);
O. a heat-responsive time-delay device (27) in heat exchange relationship with the electric heating member;
P. a circuit connected across the source of current including in series the time-delay device and the alarm;
Q. a heating element (13) in heat exchange relationship with the temperature responsive sensing element;
R. a circuit connected with the source of current and the heating element.

2. A system as defined in claim 1, characterized in that the temperature responsive sensing element is of the type having negative coefficient of resistance.

3. A system as defined in claim 1, characterized in that the temperature responsive sensing element is of the type having positive coefficient of resistance.

* * * * *